United States Patent [19]

White et al.

[11] Patent Number: 4,681,682

[45] Date of Patent: Jul. 21, 1987

[54] AIR FLOTATION CLARIFIER

[75] Inventors: Harold R. White, New Lenox; Alex J. Doncer, Palos Heights, both of Ill.

[73] Assignee: Alar Engineering Corporation, Mokena, Ill.

[21] Appl. No.: 517,504

[22] Filed: Jul. 26, 1983

[51] Int. Cl.⁴ ............................................. B03D 1/24
[52] U.S. Cl. .............................. 210/221.2; 210/241; 210/537; 210/540; 210/707; 210/765; 210/776
[58] Field of Search ............ 210/765, 703, 707, 221.1, 210/221.2, 241, 537, 538, 540, 776; 209/1, 164, 170

[56] References Cited

U.S. PATENT DOCUMENTS

| | | | |
|---|---|---|---|
| 2,793,185 | 5/1957 | Albrektsson | 210/703 |
| 3,015,396 | 1/1962 | Quast | 210/221.2 |
| 3,246,763 | 4/1966 | Baum | 210/221.2 |
| 3,301,779 | 1/1967 | Kovacs | 210/221.2 |
| 3,447,688 | 6/1969 | MacCabe | 210/540 |
| 3,627,135 | 12/1971 | Goodman | 210/221.1 |
| 4,031,006 | 6/1977 | Ramirez et al. | 210/221.2 |
| 4,193,871 | 3/1980 | White et al. | 210/142 |
| 4,216,085 | 8/1980 | Chittenden | 210/221.2 |
| 4,251,361 | 2/1981 | Grimsley | 210/221.2 |
| 4,257,900 | 3/1981 | White et al. | 210/776 |
| 4,378,290 | 3/1983 | Kennedy, Jr. | 210/241 |
| 4,383,920 | 5/1983 | Muller et al. | 210/241 |

OTHER PUBLICATIONS

"Process Design Manual for Upgrading Existing Waste Water Treatment Plant", for the Environmental Protection Agency, by Roy F. Weston, Inc., dated Oct., 1971, Chapter 10, pp. 10-1 to 10-6.
"Process Design Manual for Sludge Treatment of Disposal", issued by the U.S. Environmental Protection Agency, dated Sep., 1979, pp. 5-15 to 5-40.
"Water Supply and Polution Control", by Clark et al, Third Edition, pp. 657-661.

Primary Examiner—David L. Lacey
Attorney, Agent, or Firm—Hill, Van Santen, Steadman & Simpson

[57] ABSTRACT

A clarifier is provided with an elongated settling tank having an inlet at one end, an outlet at the opposite end, a generator producing air saturated liquid released near the inlet end of the tank to float lighter sludge to the top of the tank, suction heads removing settled out heavier sludge from the bottom of the tank, skimmers pushing scum or foam floating on top of the liquid in the tank to the overflow outlet near the inlet end of the tank, a travelling bridge moving the suction heads along the length of the tank, elongated outlets for clarified liquid projecting into the tank from the discharge end thereof, and outlets at different levels for discharge of clarified effluent and recirculating effluent. The recirculating effluent is pumped to a mixing device to be saturated with air and the air saturated effluent is discharged back into the inlet end of the tank. A pressurized tank for air saturated effluent receives the admixed air and effluent from the mixing device into the bottom thereof and air from the top of the tank is compressed by a liquid ring compressor to charge the mixing device. The dissolved air flotation takes place at the inlet end of the tank and the floating froth or scum is pushed into the top of the collector trough extending across the inlet end of the tank. A control panel on the unit monitors all of the operations and the entire unit is portable to be easily placed alongside any industrial equipment having liquid to be clarified.

12 Claims, 7 Drawing Figures

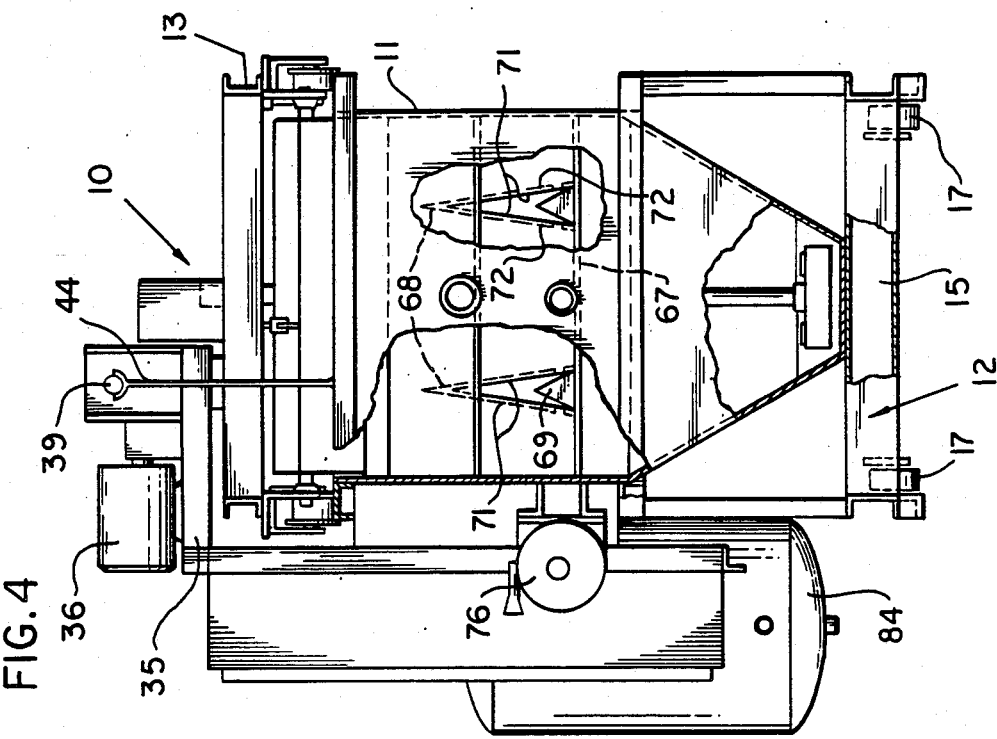
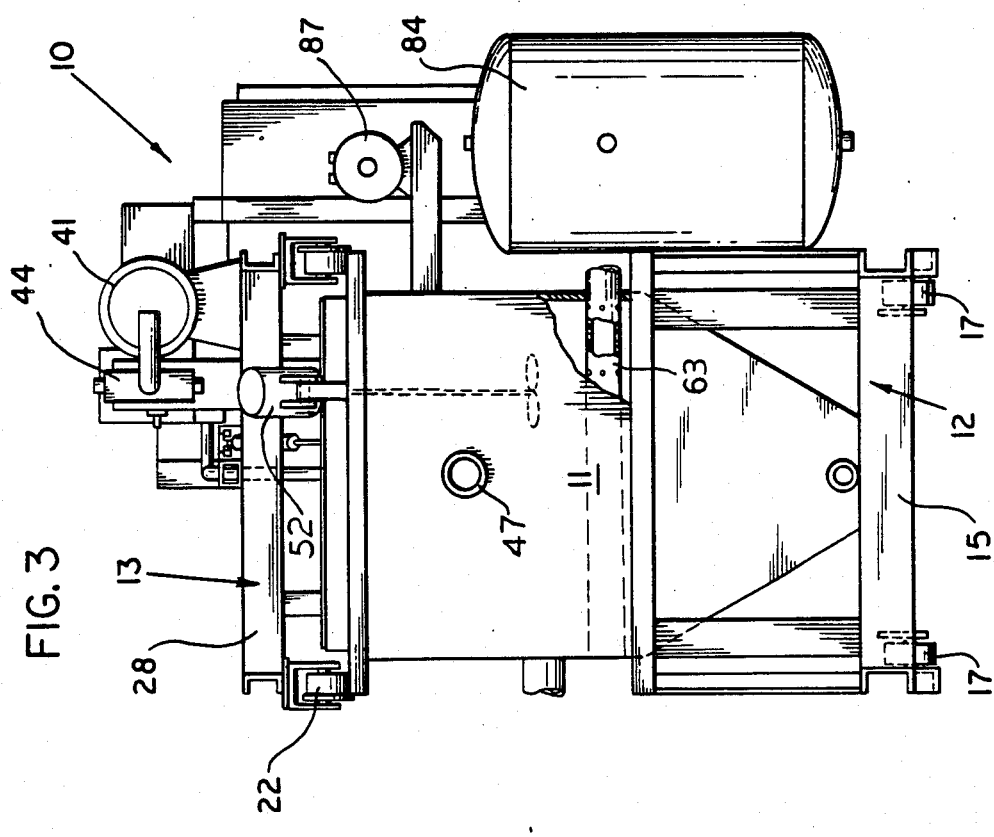

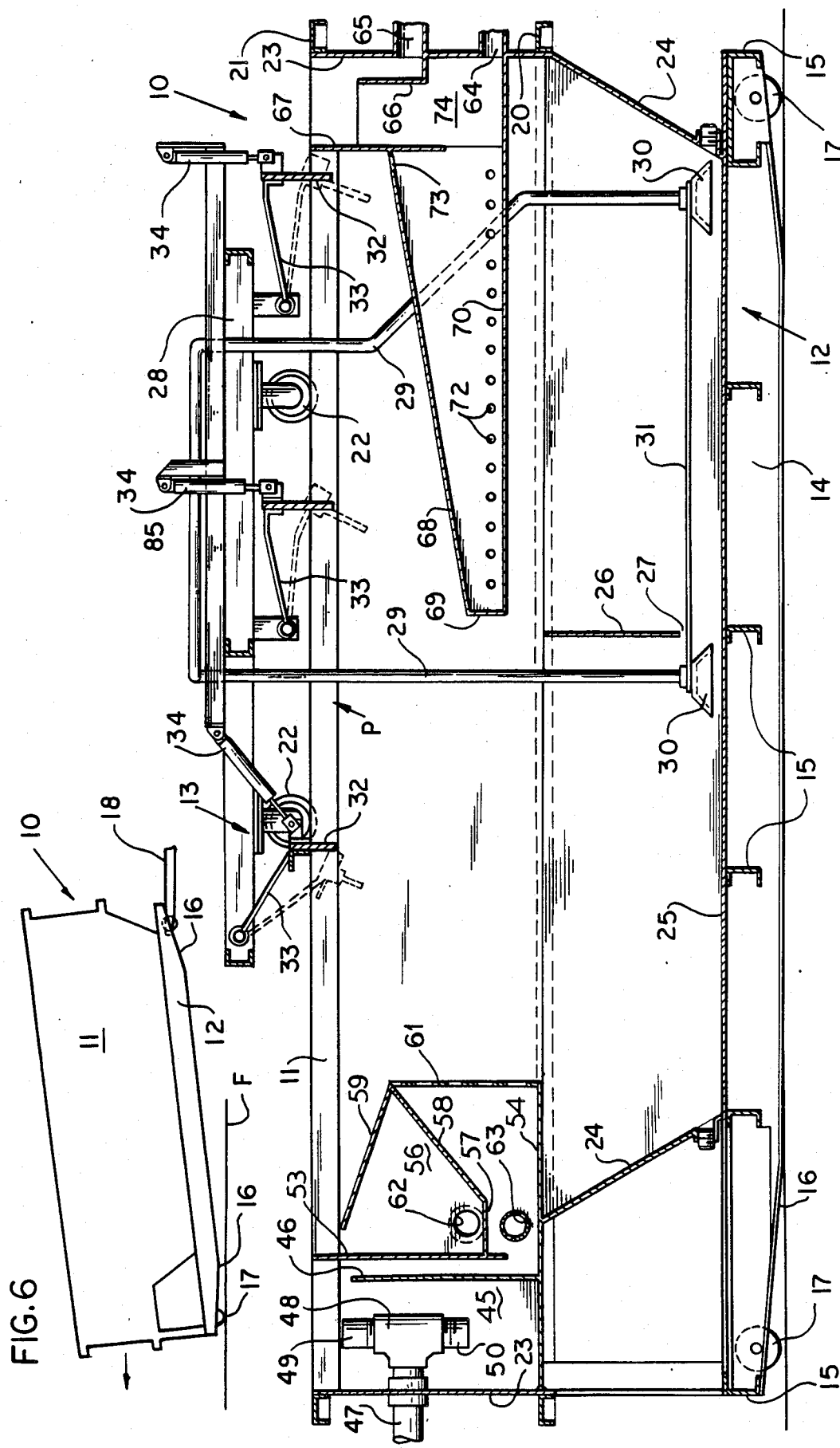

4,681,682

AIR FLOTATION CLARIFIER

BACKGROUND OF THE INVENTION

1. Field of the Invention:

This invention relates to the art of dissolved air flotation clarifiers and specifically relates to travelling bridge clarifiers operating on a combined dissolved air flotation and sludge settling process.

2. Prior Art:

Travelling bridge clarifiers or settling tanks are disclosed and claimed in our U.S. Pat. No. 4,193,871 issued Mar. 18, 1980. In these clarifiers heavy sludge settles to the bottom of the tank and is removed by suction heads suspended from the travelling bridge while lighter sludge floats to the top of the pond in the tank and is skimmed into a collector trough near the discharge end of the tank.

Dissolved air flotation systems for separating grease or fine particulate matter from industrial waste liquids are also known in the art but these systems require a constant horizontal velocity in the direction of flow of the liquid through a flotation tank which is slow enough to allow clarified liquid to form at the bottom of the tank and flow to the tank outlet without entraining air bubbles in the effluent.

It would be an improvement in the art to combine dissolved air flotation and heavy sludge settlement clarification of waste liquid in a single tank thereby speeding up the clarification process and increasing the capacity of travelling bridge clarifiers so that they may be made small enough to be easily portable for transfer to the sites of industrial equipment containing liquids to be clarified.

It would be a further improvement in the art to increase the saturation of air in the liquid introduced into the tank to effect the flotation and to remove the clarified liquid as soon as it is formed at levels adjacent the top of the tank.

SUMMARY OF THE INVENTION

This invention provides clarifiers for waste liquids, such as water polluted with particulate solids, oil, grease and the like, which remove undissolved pollutants by a combination of dissolved air flotation and sludge settling treatment carried out in a single tank providing a settling pond for liquid flowing therethrough. The tank may be small enough to be easily moved to service different sources of waste liquid. The dissolved air flotation treatment provides small air bubbles of about 40-80 microns which float the lighter pollutants to the top of the pond in the tank while permitting the heavier pollutants to settle to the bottom of the pond where they are removed by suction. The air is dissolved in water of effluent under pressure so that when pressure on the air saturated liquid is released the small bubbles will form to float the oil, grease and the like lighter pollutants. The clarified liquid is discharged along the length of the top of the pond as soon as it is formed while skimmers push the floating scum or froth back to the inlet end of the tank for discharge into an overflow trough at the inlet end. The outlet end of the tank has fingers projecting longitudinally into the tank with openings along the length thereof to collect clarified liquid as soon as it is formed. Effluent is removed at two levels at the discharge end of the tank with the lower level effluent discharge being saturated with air and fed back to the inlet end of the tank to create the flotation bubbles.

A feature of the invention includes the premixing of air with effluent as it is fed to a pressure tank to increase the dissolution of the air into the liquid.

It is then an object of this invention to provide a single tank portable clarifier treating waste liquids to a combination of dissolved air flotation and sludge settling clarification steps while the liquid continuously flows through the tank.

Another object is to remove clarified liquid from a dissolved air flotation tank as it is formed along the length of the tank.

A further object of this invention is to provide a portable travelling bridge clarifier with a dissolved air flotation system effective to float off the lighter pollutants without interfering with the gravity settling of the heavier pollutants.

A still further object of the invention is to increase the capacity and decrease the size of travelling bridge clarifiers with a dissolved air flotation apparatus treating liquid as it enters the settling tank.

Another object of this invention is to provide a method of combining dissolved air flotation and sludge settling to clarify waste liquids in a single tank.

A still further object of this invention is to provide apparatus which increases the amount of air dissolved in effluent for a dissolved air flotation treatment of waste liquids.

Other and further objects of this invention will become apparent to those skilled in this art from the following detailed description of the annexed sheets of drawings which show a best mode embodiment of the invention.

BRIEF DESCRIPTION OF THE DRAWINGS

FIG. 3 is an inlet end elevational view of the clarifier of FIGS. 1 and 2;

FIG. 4 is an outlet end elevational view of the clarifier of FIGS. 1 and 2 with parts broken away to show inside parts;

FIG. 5 is a longitudinal sectional view of the clarifier along the line V—V of FIG. 1;

FIG. 6 is a somewhat diagrammatic side elevational view illustrating the manner in which the clarifier is moved to use locations.

BRIEF DESCRIPTION OF THE ILLUSTRATED EMBODIMENT

Figure 1:
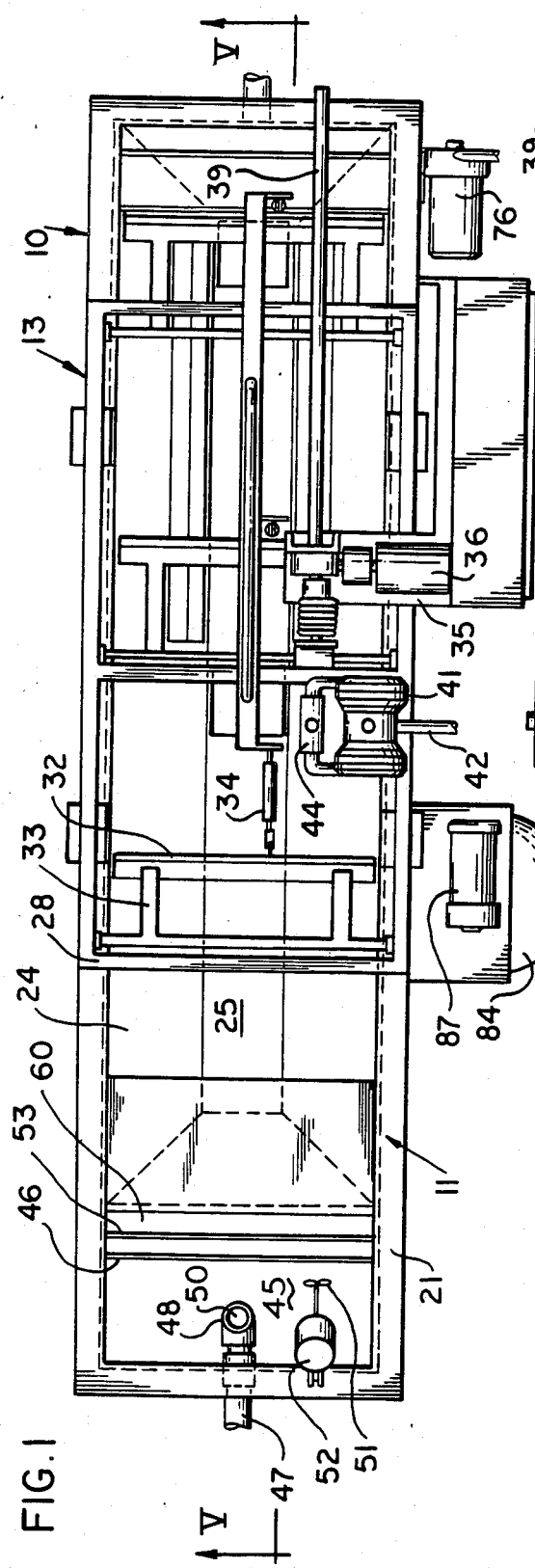
FIG. 1 is a top plan view of a clarifier of this invention.
Figure 2:
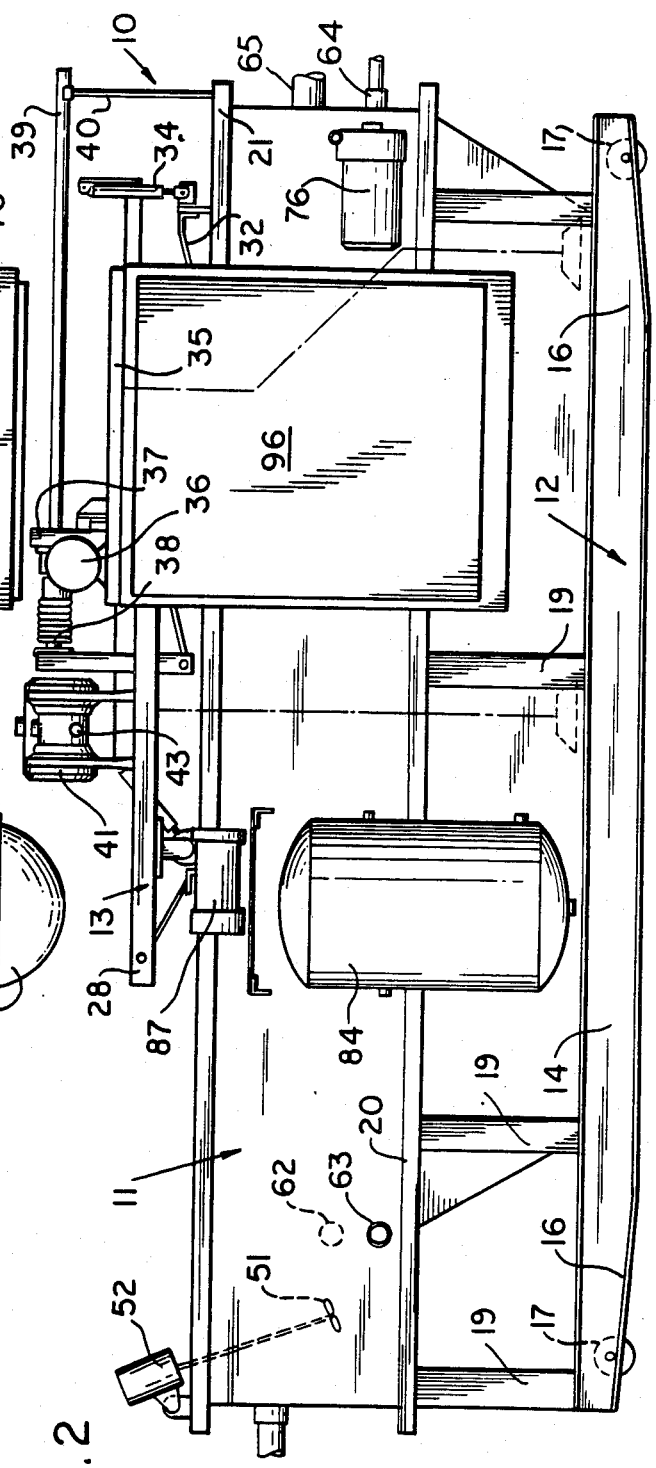
FIG. 2 is a side elevational view of the clarifier of FIG. 1.

As shown in FIGS. 1-5, the clarifier 10 of this invention includes an open top elongated rectangular settling tank 11 mounted on a rectangular base frame 12 and having a bridge 13 travelling along the top thereof.

The frame 12 has longitudinal side beams 14 extending along the length of the tank 11 and transverse crossbeams 15 providing a rigid frame or base for the tank 11. The ends of the side beams are tapered upwardly at 16 and wheels 17 are rotatably supported at these tapered ends 16. When the side beams 14 rest flat on the floor these wheels 17 are spaced above the floor but, as illustrated in FIG. 6, when one end of the frame 11 is lifted, as by means of the forks 18 of a lift truck, the tapered opposite end of the frame accommodates lowering of the wheels 17 to engage the floor F. The clarifier is thus portable and easily transported to a use or a storage location.

The frame 12 has upstanding pedestals 19 supporting a tank embracing peripheral frame 20 and the top of the tank is surrounded by a peripheral frame 21. The travelling bridge 13 has wheels 22 riding on the sides of this top peripheral frame 21. The portion of the tank between the frames 20 and 21 has vertical side walls 23 while the portion of the tank below the frame 20 has a hopper configuration 24 converging to a narrow flat bottom 25 resting on the transverse beams 15 of the frame 12. A vertical plate 26 (FIG. 5) spans the central portion of the hopper bottom but terminates above the bottom wall 25 providing an opening 27. This plate 26 reinforces the tank and serves as a baffle.

The travelling bridge 13 has a generally rectangular open frame formed from channel beams 28, and suction pipes 29 depend from this frame to suction heads 30 in the hopper bottom of the tank just about the bottom wall 25. These suction heads 30 are arranged in forward and rearward pairs and are reinforced by a frame 31 extending through the opening 27 below the plate 26. The bridge frame 28 also supports a plurality of skimmer blades 32 which are mounted on the ends of swing arms 33 to span the open top of the tank 11 for pushing scum or froth floating on the pond P in the tank back to the inlet end of the tank. Pneumatic jacks 34 raise and lower the blades and are actuated to retract the blades above the pond level as the carriage moves to the discharge end of the tank and then lower the blades into the froth or scum of the pond as the carriage moves to the inlet end of the tank. These blades 32 can be flexible to act as wipers.

The carriage 13 is reciprocated along the length of the tank 11, having a stroke of about ½ the tank length. For this purpose a platform 35 extending over the top of the bridge frame 28 supports an electric motor 36 (FIGS. 1 and 2) driving a ball nut 37 which reciprocates a rod 38 into and out of a tube housing 39 supported on a pedestal 40 from the top frame 21 of the tank. The rod is connected to the frame 28 of the bridge 13.

The bridge frame 28 also supports a pneumatic diaphragm suction pump 41 with a discharge 42 over the side of the tank and an inlet header 44 connected through pipes with the header pipes 29.

The inlet end of the tank 11 shown at the left end of the tank in FIGS. 1, 2, 5 and 7 has an inlet chamber 45 behind a vertical baffle 46 terminating below the top level of the pond P. The liquid slurry to be clarified is fed into this chamber from an inlet pipe 47 in the end wall of the tank to a tee 48 with top and bottom discharge pipes 49 and 50 threaded in the tee. The top part 49 is vertically adjustable to open just at the surface of the pond P.

The chamber 45 receives a stirrer or mixer 51 driven from an electric motor 52 adjustably mounted on the top supporting frame 21 of the tank. This stirrer or mixer keeps the solid pollutants in a suspended form and also serves to mix floculents into the slurry for facilitating flotation and settling.

Slurry from the chamber 45 flows over the baffle 46 behind a second baffle or wall 53 terminating above a horizontal bottom wall 54 level with the bottom of the vertical portion of the tank. A flow passage 55 is provided under this second baffle 53.

An overflow trough 56 is provided in front of the baffle 53 and is defined by a flat bottom wall portion 57 parallel with the bottom wall 54, a forwardly and upwardly inclined wall portion 58 and an upwardly and rearwardly inclined wall portion 59. This wall portion 59 terminates in spaced relation in front of the baffle 53 to provide an opening 60 into the top of the trough chamber 56.

A perforated vertical plate 61 spans the space between the bottom wall 54 and the junction of the inclined walls 58 and 59. The trough chamber 56 is drained by an outlet 62 in the bottom of the trough chamber.

A slotted or perforated inlet pipe 63 spans the passageway between the bottom wall 54 and the bottom 57 of the trough in front of the space 55 under the baffle 53 to feed air saturated effluent into the slurry flowing to the perforated baffle 61 and releasing small air bubbles. The aerated effluent is thus distributed across the width of the tank above the level of the sump portion where the air bubbles can carry the lighter pollutants to the top of the pond forming a froth or scum which is pushed into the open top 60 of the trough 56 by the wipers 32. Thus a dissolved air flotation separation occurs at the inlet end of the tank.

The liquid being clarified flows longitudinally through the tank at a rate permitting the heavier sludge to settle to the bottom of the hopper 24 where it is removed through the suction heads 30 as they are swept slowly along the length of the tank when the bridge is reciprocated.

The discharge end of the tank 11 has outlets 64 and 65 at two different levels as best shown in FIG. 5. An upstanding baffle 66 rises from the top outlet 65 in the tank to a level below the level of the pond P. A wall baffle 67 spans the width of the tank 11 extending downwardly from the open top thereof to a level below the outlet 65 and above the outlet 64.

A pair of spaced parallel finger-like weirs 68 extend forwardly from the plate 67 into the tank 11. These weirs, as shown in FIG. 4, have a triangular cross-section with a sloping apex shown in FIG. 5 rising from a short front nose 69 to the baffle 67 at a level above the outlet 65. The finger-like weirs have horizontal bottom walls 70 flush with the outlet 64. The sloping sides 71 of the triangularly shaped weirs (FIG. 4) have a row of longitudinally spaced holes 72 through the bottom portion thereof (FIG. 5). The apex of each weir also has a hole 73 therethrough adjacent the baffle 67.

The arrangement is such that the weirs project into the tank 11 for about ⅛ to ½ of the length of the tank and clarified liquid drains through the holes 72 along the length of the weirs into the bottom of a compartment 74 behind the baffle 67. Then the liquid can rise in this compartment where the most clarified portion is drained over the baffle 66 to the top outlet 65 while partially clarified effluent can discharge through the bottom outlet 64 from the lower portion of the compartment. Flow is regulated to settle the sludge below the level of the weirs and to collect clarified liquid as soon as it is formed in the tank with a further settling occurring in a discharge compartment overflowing into a top outlet for fully clarified liquid and underflowing through a bottom outlet for partially clarified effluent.

Outflow from the bottom outlet 64 is controlled or metered by a valve 75 (FIG. 7) discharging to a pump 76 feeding a filter 77 through a check valve 78 preventing back flow. The filter 77 discharges to an effluent-air mixer 78'. The top outlet 65 discharges through a pipeline to a pump 79 for recirculation of the fully clarified liquid for reuse or to a sewer.

Figure 7:
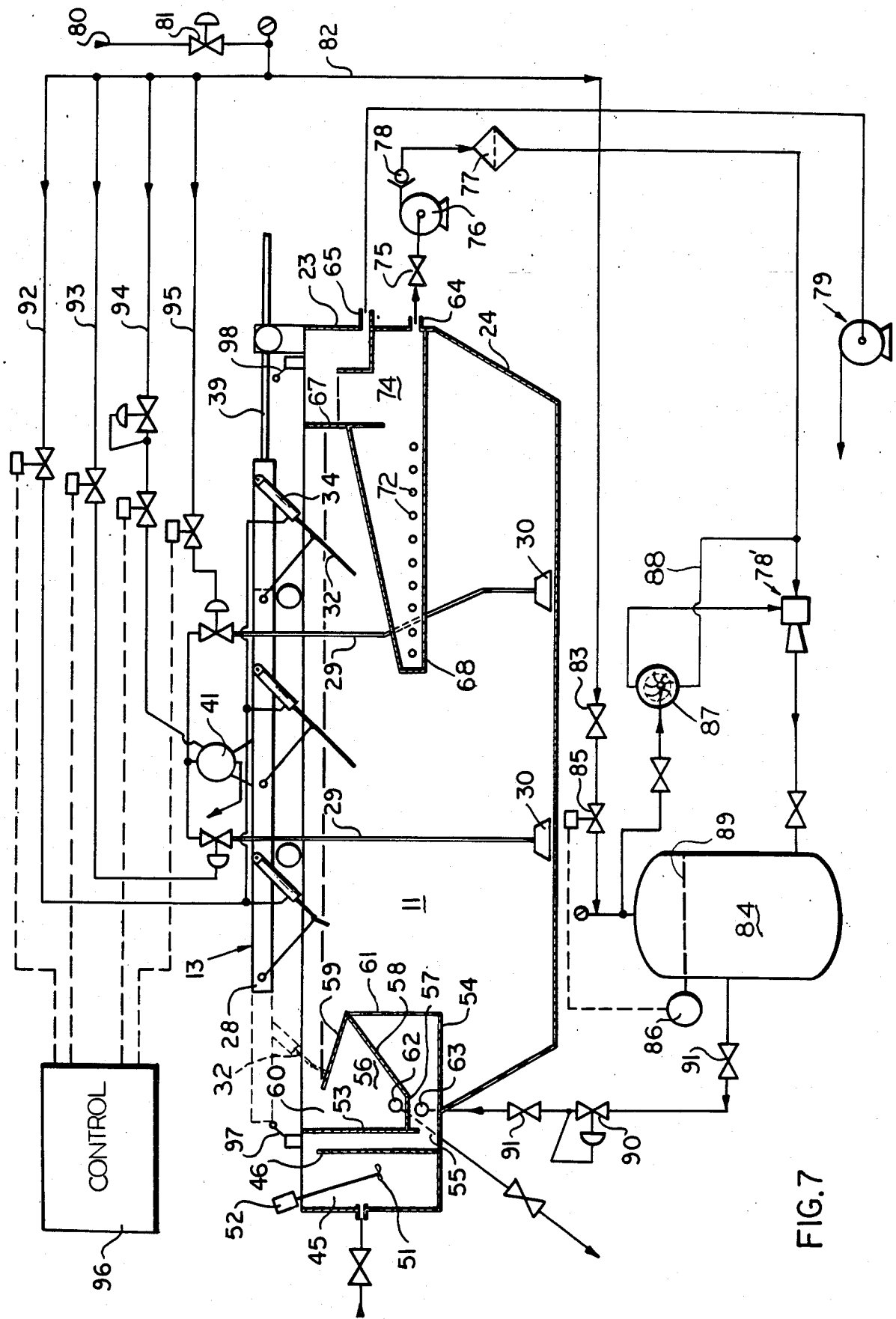
FIG. 7 is a view similar to FIG. 6 including a flow diagram.

An air source 80 (FIG. 7) controlled through a pressure regulator valve 81 supplies a header pipe 82 feeding a valve 83 discharging into the top of a pressure tank 84. A second valve 85 is triggered by a sensor 86 sensitive to the air-liquid interface in the top of the tank 84. When the interface level is such as to call for introduction of additional liquid, air is introduced to a liquid ring compressor 87 which supplies compressed air to the mixer 78' thereby propelling aerated liquid into the lower portion of the tank. The liquid ring compressor thus circulates air from the top of the tank bringing it into intimate contact with the incoming liquid to be saturated. The air blanket in the saturation tank 84 is maintained by the level sensor 86 which adds air as needed. The circulation and mixing of large quantities of air with the effluent produces almost 100% saturation of the air in the effluent. The recycle pump 76 together with the back pressure valve 78 maintains a saturation pressure preferably at 40 psig. The only air added to the system is thus controlled in amounts just sufficient to replace the air dissolved in the liquid. The liquid ring compressor 87 provides just enough additional pressure to overcome the pressure drop in the mixer 78'. A boost of only 5 psig is sufficient. Effluent is supplied to maintain liquid in the compressor 87 via a pipe 88 (FIG. 7). As a result the horsepower required for creating the air saturated liquid is substantially reduced from 12 hp per 100 square feet to 5 hp per 100 square feet.

The aerated liquid is discharged from below the air-liquid interface 89 in the pressure tank 84 through a pressure regulator 90 in a discharge line feeding the inlet pipe 63. Manual valves 91 on each side of this pressure regulator valve may also be provided.

The air header 82 supplies valved branches 92 serving the wiper jacks 34, 93 serving the suction connection between the rear suction heads and the pump 41, 94 serving the driving of the pump 41, and 95 serving the suction connection between the forward suction heads 30 and the pump 41. The valves are electrically controlled from a central control panel 96.

Limit switches 97 and 98 at the inlet and outlet ends of the settling tank 11 are triggered by the travelling bridge 13 to reverse the stroke of the bridge as it approaches the ends of the tank. As illustrated in dotted lines, the wiper adjacent the overflow trough can ride on the inclined top wall 59 to push the scum and froth into the opening 60.

To provide for ease in moving the clarifier between source sites such as industrial equipment containing water or other liquid polluted with solids, oil, grease and the like, the overall dimensions of the clarifier can be reduced to 3 feet wide by 12 feet long with all of the operating equipment mounted on the unit and only requiring a conventional electrical source and a conventional shop air source. If desired, of course, an electrically driven air compressor could be provided where shop air is not convenient. The overall height of the clarifier can be reduced to about 4 feet.

It has been found that liquid can be circulated through the clarifier at flow rates almost double the maximum rates available for dissolved air flotation units.

It will therefore be understood to those skilled in this art that this invention now provides efficient portable clarifiers combining dissolved air flotation and sludge settling with clarified liquid removal along a substantial length portion of the settling tank.

While various changes and modifications might be proposed by those skilled in the art, it will be understood that we wish to include within the claims of the patent warranted hereon all such changes and modifications as reasonably come within our contribution to the art.

We claim as our invention:

1. A clarifier comprising an elongated settling tank for a pond of liquid having an inlet at one end, an outlet at the other end, and an overflow trough intermediate said ends, suction means for removing sludge from the bottom of the tank, skimmers for pushing floating scum on a pond when in the tank into said trough, a pressure tank, a compressed air source discharging to the top of said pressure tank, an air-liquid mixer discharging to said pressure tank, a compressor receiving air from the top of said pressure tank discharging to said mixer, means feeding effluent from the outlet of said settling tank to said mixer, means feeding air saturated effluent from said pressure tank to the inlet end of said settling tank, and means projecting into said settling tank from the outlet end thereof for removing clarified liquid as it is formed in the settling tank.

2. The clarifier of claim 1 wherein the compressor is a liquid ring compressor receiving effluent to maintain a liquid ring therein.

3. The clarifier of claim 1 wherein the outlet end of the tank has a low level outlet for effluent fed to the mixer and a high level outlet for clarified liquid.

4. The clarifier of claim 1 wherein the means feeding the effluent to the mixer is a pump maintaining a back pressure on the mixer.

5. The clarifier of claim 1 including a plurality of hollow closed periphery fingers projecting into the tank in side-by-side relation from the outlet end of the tank and having interior drain passages communicating with said outlet together with inlets for clarified liquid along the lengths thereof.

6. A portable clarifier which comprises a longitudinally elongated base frame having a bottom for resting on the floor and wheels at ends above said bottom selectively engageable with said floor to transport the clarifier to use sites, a longitudinally elongated open top settling tank supported on said base frame having a converging hopper lower portion with a sludge collecting trough along the length thereof, means for flowing liquid to be clarified into one end of the tank, means discharging clarified liquid from the opposite end of the tank, a bridge riding over the open top of the tank, means reciprocating said bridge along the length of said tank, suction heads in said trough suspended from said bridge to evacuate settled out sludge from the trough, a scum overflow trough extending across said tank, means discharging air saturated liquid into the inlet end of said tank intermediate the top and bottom thereof to release air bubbles floating lighter contaminants to the top of the tank, skimmers suspended from said bridge pushing scum which floats on top of a liquid when contained in the tank into said scum collecting trough, and closed periphery weir fingers projecting into the tank from the discharge end thereof receiving clarified liquid below the liquid level in the pond when in the tank as it is formed for discharge from said opposite end of the tank.

7. The portable clarifier of claim 6 wherein the base frame has upwardly inclined ends suspending the wheels out of contact with the floor when the bottom rests on the floor and accommodating lifting of one end of the frame to lower the wheels at the other end of the frame into contact with the floor for accommodating transport of the clarifier to the use sites.

8. The clarifier of claim 6 wherein the weir fingers are hollow upstanding triangles with top apices, side walls diverging from the apices, and a bottom wall connecting the divergent ends of the side walls, and each of said side walls having a row of holes along the length thereof.

9. The portable clarifier of claim 8, wherein the hollow triangular fingers have sloping apices increasing in height toward the discharge end of the settling tank.

10. A travelling bridge clarifier which comprises an elongated open top settling tank for containing a pond of liquid, a travelling bridge riding over the top of said tank, suction heads suspended from said bridge adjacent the bottom of the tank for removing sludge settled from a pond of liquid when contained in the tank, means for reciprocating said bridge along the length of the tank to move the suction heads for acting on the entire bottom of the tank, an upright diffuser baffle in said tank adjacent one end thereof, means at one end of the tank defining an open top inlet chamber discharging into the tank through said diffuser baffle at a level intermediate the top and bottom of the tank, an overflow trough for receiving scum floating on a pond of liquid when in the tank, a high level outlet and a low level outlet at the end of the tank opposite said one end, said high level outlet receiving clarified liquid from the top of the pond, said low level outlet receiving effluent below the top of the pond, a pressure tank, an air source discharging into the top of the tank a compressor receiving air from the top of the tank, an air-effluent mixer receiving air from said compressor and effluent from said low level outlet and discharging into the pressure tank to provide a pond of effluent saturated with air dissolved therein, and means discharging the air saturated effluent from the pressure tank into the settling tank behind said diffuser baffle.

11. The clarifier of claim 10 wherein the diffuser baffle is a perforated upstanding plate.

12. The clarifier of claim 10 including a liquid ring compressor discharging air into the mixer.

* * * * *